(12) United States Patent
Arai et al.

(10) Patent No.: US 10,488,949 B2
(45) Date of Patent: Nov. 26, 2019

(54) VISUAL-FIELD INFORMATION COLLECTION METHOD AND SYSTEM FOR EXECUTING THE VISUAL-FIELD INFORMATION COLLECTION METHOD

(71) Applicant: COLOPL, INC., Tokyo (JP)

(72) Inventors: Yuichiro Arai, Tokyo (JP); Kosuke Shiraki, Kanagawa (JP)

(73) Assignee: COLOPL, INC., Tokyo (JP)

( * ) Notice: Subject to any disclaimer, the term of this patent is extended or adjusted under 35 U.S.C. 154(b) by 3 days.

(21) Appl. No.: 15/832,644

(22) Filed: Dec. 5, 2017

(65) Prior Publication Data

US 2018/0107287 A1   Apr. 19, 2018

Related U.S. Application Data

(63) Continuation of application No. 15/597,117, filed on May 16, 2017, now Pat. No. 9,857,884.

(30) Foreign Application Priority Data

May 18, 2016 (JP) ................................. 2016-099515

(51) Int. Cl.
  *G06F 3/03* (2006.01)
  *G06F 3/01* (2006.01)
  (Continued)

(52) U.S. Cl.
  CPC ............ *G06F 3/0321* (2013.01); *G06F 1/163* (2013.01); *G06F 3/011* (2013.01); *G06F 3/012* (2013.01);
  (Continued)

(58) Field of Classification Search
  None
  See application file for complete search history.

(56) References Cited

U.S. PATENT DOCUMENTS

2005/0179685 A1   8/2005   Kake et al.
2017/0092006 A1   3/2017   Inomata

FOREIGN PATENT DOCUMENTS

JP      2003-248844 A   9/2003
JP      5882517 B1      3/2016
           (Continued)

OTHER PUBLICATIONS

Decision to Grant a Patent in JP Patent Application No. 2016-099515, dated Jan. 31, 2017.

*Primary Examiner* — Jack Dinh
(74) *Attorney, Agent, or Firm* — Hauptman Ham, LLP (57) ABSTRACT

A visual-field information collection method is capable of collecting visual-field information of a user wearing a head mounted display without applying a large calculation load to a processor. The visual-field information collection method to be executed by a processor includes arranging, in a virtual space in which a user wearing an HMD is immersed, a virtual camera that defines a visual axis for specifying a visual field of the user. The method includes determining the visual axis in accordance with one of a movement of the HMD and a line-of-sight direction of the user. The method includes determining whether or not the visual axis is moved from a predetermined first position to a predetermined second position. The method includes generating movement information representing that the visual axis is moved when the visual axis is moved from the predetermined first position to the predetermined second position.

11 Claims, 10 Drawing Sheets

(51) Int. Cl.
*G06K 9/00* (2006.01)
*G06F 1/16* (2006.01)
*G02B 27/01* (2006.01)

(52) U.S. Cl.
CPC .. *G06K 9/00604* (2013.01); *A63F 2300/6661* (2013.01); *G02B 27/017* (2013.01); *G02B 2027/0138* (2013.01); *G02B 2027/0187* (2013.01); *G02B 2027/0198* (2013.01); *G06K 9/00228* (2013.01)

(56) References Cited

FOREIGN PATENT DOCUMENTS

| | | |
|---|---|---|
| JP | 5913709 B1 | 4/2016 |
| JP | 5914739 B1 | 5/2016 |
| WO | 2016/009864 A1 | 1/2016 |

VISUAL-FIELD INFORMATION COLLECTION METHOD AND SYSTEM FOR EXECUTING THE VISUAL-FIELD INFORMATION COLLECTION METHOD

RELATED APPLICATIONS

The present application is a continuation of U.S. patent application Ser. No. 15/597,117, filed May 16, 2017, which claims priority to Japanese Application Number 2016-099515, filed May 18, 2016, the disclosures of which are hereby incorporated by reference herein in their entirety.

BACKGROUND

This disclosure relates to a visual-field information collection method and a system for executing the visual-field information collection method.

For example, as disclosed in Japanese Patent Application Laid-open No. 2003-248844, there is known a method involving acquiring a user's action history in a game space generated by a related-art game machine, for example, PlayStation®, and setting a land value and an advertisement fee in a virtual space based on the user's action history.

The method disclosed in Japanese Patent Application Laid-open No. 2003-248844 presupposes a game space generated by a related-art game machine, for example, PlayStation, and hence a visual-field image that changes in accordance with a change in user's field of view is not assumed.

Meanwhile, when the visual-field image to be visually recognized by the user changes in accordance with a movement of a head mounted display (HMD) or the like, a large calculation load is applied to a processor configured to generate the visual-field image. In such a case, when a large calculation load is required for processing of collecting user's visual-field information data, which is executed in the background, the limit of the calculation processing ability of the processor may be exceeded. Thus, the visual-field image may be unchangeable in accordance with the movement of the HMD. As a result of the visual-field image not changing in accordance with the movement of the user, the user may suffer from virtual reality (VR) sickness.

SUMMARY

This disclosure helps to provide a visual-field information collection method capable of collecting visual-field information of a user wearing a head mounted display without applying a large calculation load to a processor. Further, this disclosure has an object to provide a system for executing the visual-field information collection method.

According to at least one embodiment of this disclosure, there is provided a visual-field information collection method to be executed by a processor. The visual-field information collection method includes arranging, in a virtual space in which a user wearing a head mounted display is immersed, a virtual camera that defines a visual axis for specifying a visual field of the user. The method further includes determining the visual axis in accordance with one of a movement of the head mounted display and a line-of-sight direction of the user. The method further includes determining whether or not the visual axis is moved from a predetermined first position to a predetermined second position. The method further includes generating movement information representing that the visual axis is moved when the visual axis is moved from the predetermined first position to the predetermined second position.

According to this disclosure, providing the visual-field information collection method capable of collecting the visual-field information of the user wearing the head mounted display without applying a large calculation load to the processor is possible.

DETAILED DESCRIPTION

A summary of at least one embodiment of this disclosure is described.

(Item 1) A visual-field information collection method to be executed by a processor. The visual-field information collection method includes arranging, in a virtual space in which a user wearing a head mounted display is immersed, a virtual camera that defines a visual axis for specifying a visual field of the user. The method further includes determining the visual axis in accordance with one of a movement of the head mounted display and a line-of-sight direction of the user. The method further includes determining whether or not the visual axis is moved from a predetermined first position to a predetermined second position. The method further includes generating movement information representing that the visual axis is moved when the visual axis is moved from the predetermined first position to the predetermined second position.

According to the above-mentioned method, the movement information is generated when the visual axis is moved from the predetermined first position to the predetermined second position. In this manner, the movement information is not generated for all of the movements of the user wearing the head mounted display, and hence a calculation amount of the processor can be reduced.

(Item 2) A visual-field information collection method according to Item (1), further including sectioning a surface of the virtual space into a plurality of regions. The method further includes determining a position of an intersection at which the visual axis and the surface of the virtual space intersect with each other. Determining whether or not the visual axis is moved from the predetermined first position to the predetermined second position includes determining whether or not the intersection is moved from a first partial region to a second partial region among the plurality of regions. Generating the movement information when the intersection is moved from the first partial region to the second partial region.

According to the above-mentioned method, the surface of the virtual space is sectioned into the plurality of regions, and the movement information is generated when the intersection at which the visual axis and the surface of the virtual space intersect with each other is moved from the first partial region to the second partial region. In this manner, the movement information is not generated for all of the movements of the user wearing the head mounted display, and hence the calculation amount of the processor can be reduced.

(Item 3) A visual-field information collection method according to Item (2), further including acquiring time information representing a time when the intersection is moved to the second partial region when the intersection is moved from the first partial region to the second partial region.

According to the above-mentioned method, the time information representing the time when the intersection is moved to the second partial region is acquired together with the movement information, and hence the user's visual-field information can be analyzed from various angles.

(Item 4) A visual-field information collection method according to Item (3), further including transmitting, to a server, visual-field information data generated based on a plurality of pieces of movement information and a plurality of pieces of time information when virtual space data representing the virtual space is updated.

According to the above-mentioned method, the visual-field information data is transmitted to the server when the virtual space data is updated. In this manner, the movement information and the time information are not transmitted to the server every time the movement information and the time information are acquired, and hence a load of communication between a user terminal and the server can be reduced.

(Item 5) A visual-field information collection method according to any one of Items (2) to (4), further including determining a reference intersection at which a reference visual axis, which defines a reference visual field of the virtual camera, and the surface of the virtual space intersect with each other. Sectioning the surface of the virtual space into the plurality of regions includes sectioning the surface of the virtual space so that the reference intersection is prevented from being located on a boundary line between the plurality of regions.

According to the above-mentioned method, the surface of the virtual space is sectioned into the plurality of regions so that the reference intersection is prevented from being located on the boundary line between the plurality of regions, and hence a situation where the calculation load of the processor is increased as described above can be prevented.

(Item 6) A visual-field information collection method according to Item (5), in which sectioning the surface of the virtual space into the plurality of regions includes sectioning the surface of the virtual space so that the reference intersection is located at a center of a predetermined partial region among the plurality of regions and at a vicinity of the center.

According to the above-mentioned method, the surface of the virtual space is sectioned into the plurality of regions so that the reference intersection is located at the center of the predetermined partial region among the plurality of regions and at the vicinity of the center, and hence a situation where the intersection is moved to a different partial region due to a small movement of the user wearing the head mounted display can be reduced or prevented. In this manner, a situation where the calculation load of the processor is increased can be reduced or prevented.

(Item 7) A visual-field information collection method according to any one of Items (2) to (6), in which sectioning the surface of the virtual space into the plurality of regions includes using a plurality of latitude lines arranged at a first angular spacing and a plurality of longitude lines arranged at a second angular spacing.

According to the above-mentioned method, a determination is made regarding whether the intersection is moved to a different partial region based on information relating to an angle (longitude and latitude) of the visual axis of the virtual camera. In this manner, calculating coordinates of the intersection between the surface of the virtual space and the visual axis is avoided, and hence the calculation amount of the processor can be reduced. That is, determining whether or not the intersection is moved to a different partial region based on the change in angle of the visual axis is possible. Further, each partial region can be equally treated when the movement information is subjected to statistical processing.

(Item 8) A visual-field information collection method according to any one of Items (2) to (6), further including determining a reference intersection at which a reference visual axis, which defines a reference visual field of the virtual camera, and the surface of the virtual space intersect with each other. Sectioning the surface of the virtual space into the plurality of regions includes using a plurality of latitude lines and a plurality of longitude lines. One of an angular spacing between adjacent latitude lines or an angular spacing between adjacent longitude lines is increased as the adjacent latitude lines and the adjacent longitude lines are separated from the reference intersection.

According to the above-mentioned method, the angular spacing between the adjacent latitude lines or the angular spacing between the adjacent longitude lines are increased as the lines are separated from the reference intersection. In this manner, the angular spacing is decreased at a divided region in the vicinity of the reference intersection at which a movement of the intersection among the regions is most frequently observed. In this manner, the visual-field information can be collected more precisely.

(Item 9) A visual-field information collection method according to Item (1), in which determining that the visual axis is moved from the predetermined first position to the predetermined second position includes determining when a maximum value of a movement amount of the visual axis within unit time exceeds a predetermined threshold value.

According to the above-mentioned method, whether the visual axis is moved from the predetermined first position to the predetermined second position when the maximum value of the movement amount of the visual axis within unit time exceeds the predetermined threshold value is determined. Therefore, the movement information is not generated for all of the movements of the head mounted display, and hence the calculation amount of the processor can be reduced.

(Item 10) A system for executing the visual-field information collection method of any one of Items (1) to (9).

According to the above-mentioned method, the system is capable of collecting the visual-field information of the user wearing the head mounted display without applying a large calculation load to the processor.

At least one embodiment of this disclosure is described below with reference to the drawings. Once a component is described in this description of at least one embodiment, a description on a component having the same reference number as that of the already described component is omitted for the sake of convenience of description.

Figure 1:
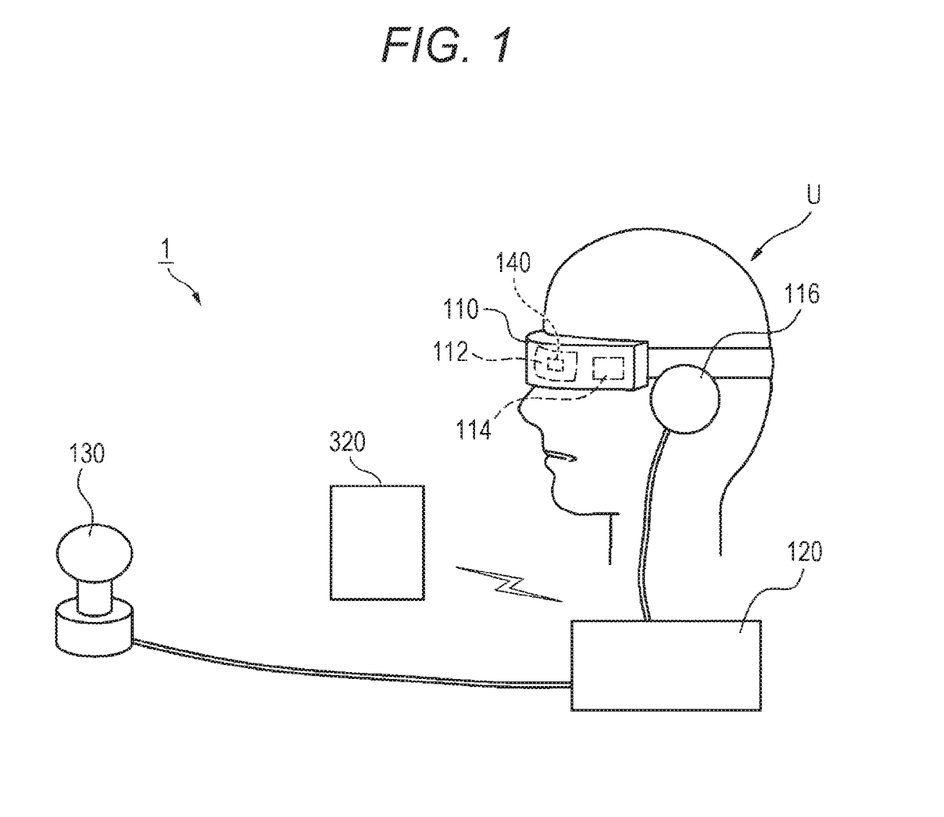
FIG. 1 is a schematic view of a head mounted display (HMD) system according to at least one embodiment of this disclosure.

FIG. 1 is a schematic diagram of a head mounted display (hereinafter simply referred to as "HMD") system 1 according to at least one embodiment of this disclosure. As illustrated in FIG. 1, the HMD system 1 includes an HMD 110 worn on a head of a user U, a position sensor 130, an external controller 320, and a control device 120.

The HMD 110 includes a display unit 112, an HMD sensor 114, headphones 116, and an eye gaze sensor 140. A speaker or headphones independent from the HMD 110 may be used instead of providing the headphones 116 to the HMD 110.

The display unit 112 includes a non-transmissive (or partially transmissive) display device configured to completely cover a field of view (visual field) of the user U wearing the HMD 110. With this, the user U can see only a visual-field image displayed on the display unit 112, and hence the user U can be immersed in a virtual space. The display unit 112 may include a left-eye display unit configured to project an image onto a left eye of the user U, and a right-eye display unit configured to project an image onto a right eye of the user U.

The HMD sensor 114 is mounted near the display unit 112 of the HMD 110. The HMD sensor 114 includes at least one of a geomagnetic sensor, an acceleration sensor, and an inclination sensor (for example, an angular velocity sensor or a gyro sensor), and can detect various movements of the HMD 110 worn on the head of the user U.

The eye gaze sensor 140 has an eye tracking function of detecting a line-of-sight direction of the user U. For example, the eye gaze sensor 140 includes a right-eye sensor and a left-eye sensor. The right-eye sensor may be configured to detect reflective light reflected from the right eye (in particular, the cornea or the iris) of the user U by irradiating the right eye with infrared light, to thereby acquire information relating to a rotational angle of a right eyeball. Meanwhile, the left-eye sensor may be configured to detect reflective light reflected from the left eye (in particular, the cornea or the iris) of the user U by irradiating the left eye with infrared light, to thereby acquire information relating to a rotational angle of a left eyeball.

The position sensor 130 is constructed of, for example, a position tracking camera, and is configured to detect the positions of the HMD 110 and the external controller 320. The position sensor 130 is connected to the control device 120 so as to enable communication to/from the control device 120 in a wireless or wired manner. The position sensor 130 is configured to detect information relating to positions, inclinations, or light emitting intensities of a plurality of detection points (not shown) provided in the HMD 110. Further, the position sensor 130 is configured to detect information relating to positions, inclinations, and/or light emitting intensities of a plurality of detection points (not shown) provided in the external controller 320. The detection points are, for example, light emitting portions configured to emit infrared light or visible light. Further, the position sensor 130 may include an infrared sensor or a plurality of optical cameras.

The external controller 320 is used by the user U to control, for example, a movement of a finger object to be displayed in the virtual space. The external controller 320 may include a right-hand external controller to be used by being held by a right hand of the user U, and a left-hand external controller to be used by being held by a left hand of the user U. The right-hand external controller is a device configured to indicate the position of the right hand of the user U and the movement of the fingers of the right hand of the user U. The left-hand external controller is a device configured to indicate the position of the left hand of the user U and the movement of the fingers of the left hand of the user U. The external controller 320 may include a plurality of operation buttons, a plurality of detection points, a sensor, and a transceiver.

The control device 120 is capable of acquiring information of the position of the HMD 110 based on the information acquired from the position sensor 130, and accurately associating the position of the virtual camera in the virtual space with the position of the user U wearing the HMD 110 in a real space based on the acquired information of the position of the HMD 110. Further, the control device 120 is capable of acquiring information of the position of the external controller 320 based on the information acquired from the position sensor 130, and accurately associating the position of the finger object to be displayed in the virtual space with a relative positional relationship between the external controller 320 and the HMD 110 in the real space based on the acquired information of the position of the external controller 320.

Further, the control device 120 is capable of specifying each of the line of sight of the right eye of the user U and the line of sight of the left eye of the user U based on the information transmitted from the eye gaze sensor 140, to thereby specify a point of gaze being an intersection between the line of sight of the right eye and the line of sight of the left eye. Further, the control device 120 is capable of specifying a line-of-sight direction of the user U based on the specified point of gaze. In this case, the line-of-sight direction of the user U is a line-of-sight direction of both eyes of the user U, and matches a direction of a straight line passing through the point of gaze and a midpoint of a line segment connecting between the right eye and the left eye of the user U.

Figure 2:
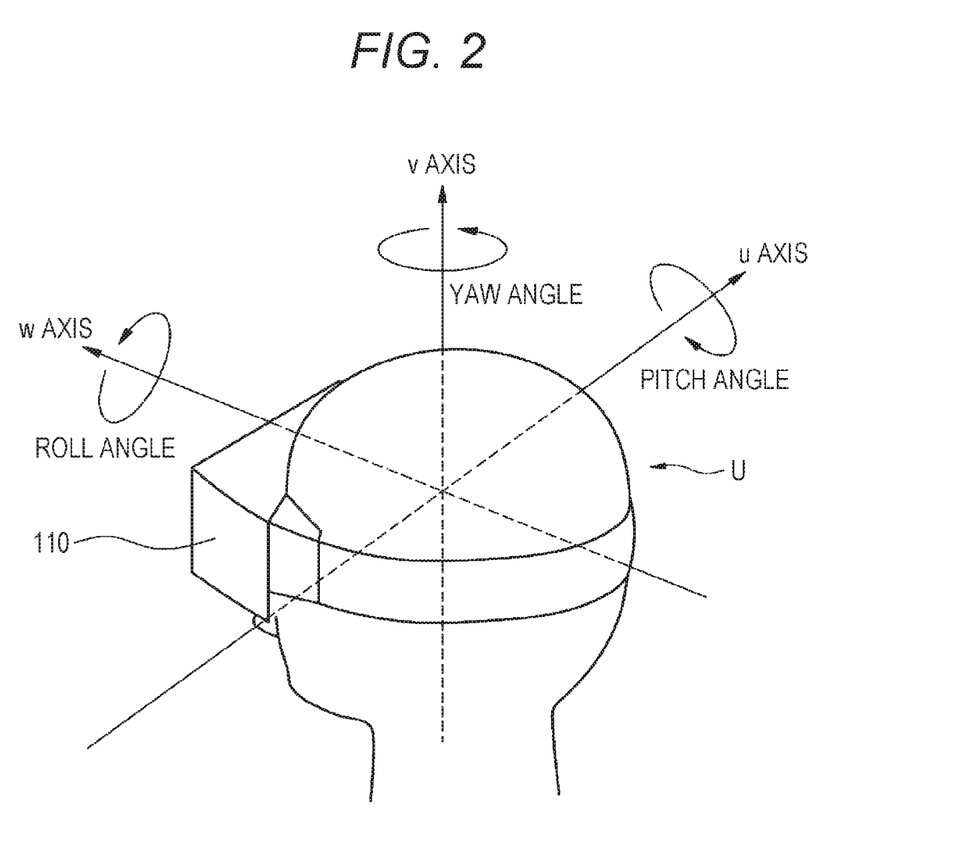
FIG. 2 is a diagram of a head of a user wearing an HMD according to at least one embodiment of this disclosure.

Next, with reference to FIG. 2, a method of acquiring information relating to a position and an inclination of the HMD 110 is described. FIG. 2 is a diagram of the head of the user U wearing the HMD 110. The information relating to the position and the inclination of the HMD 110, which are synchronized with the movement of the head of the user U wearing the HMD 110, can be detected by the position sensor 130 and/or the HMD sensor 114 mounted on the HMD 110. In FIG. 2, three-dimensional coordinates (uvw coordinates) are defined about the head of the user U wearing the HMD 110. A perpendicular direction in which the user U stands upright is defined as a v axis, a direction being orthogonal to the v axis and connecting the center of the display unit 112 and the user U is defined as a w axis, and a direction orthogonal to the v axis and the w axis is defined as a u direction. The position sensor 130 and/or the HMD sensor 114 are/is configured to detect angles about the respective uvw axes (that is, inclinations determined by a yaw angle representing the rotation about the v axis, a pitch angle representing the rotation about the u axis, and a roll angle representing the rotation about the w axis). The control device 120 is configured to determine angular information for controlling a visual axis of the virtual camera based on the detected change in angles about the respective uvw axes.

Figure 3:
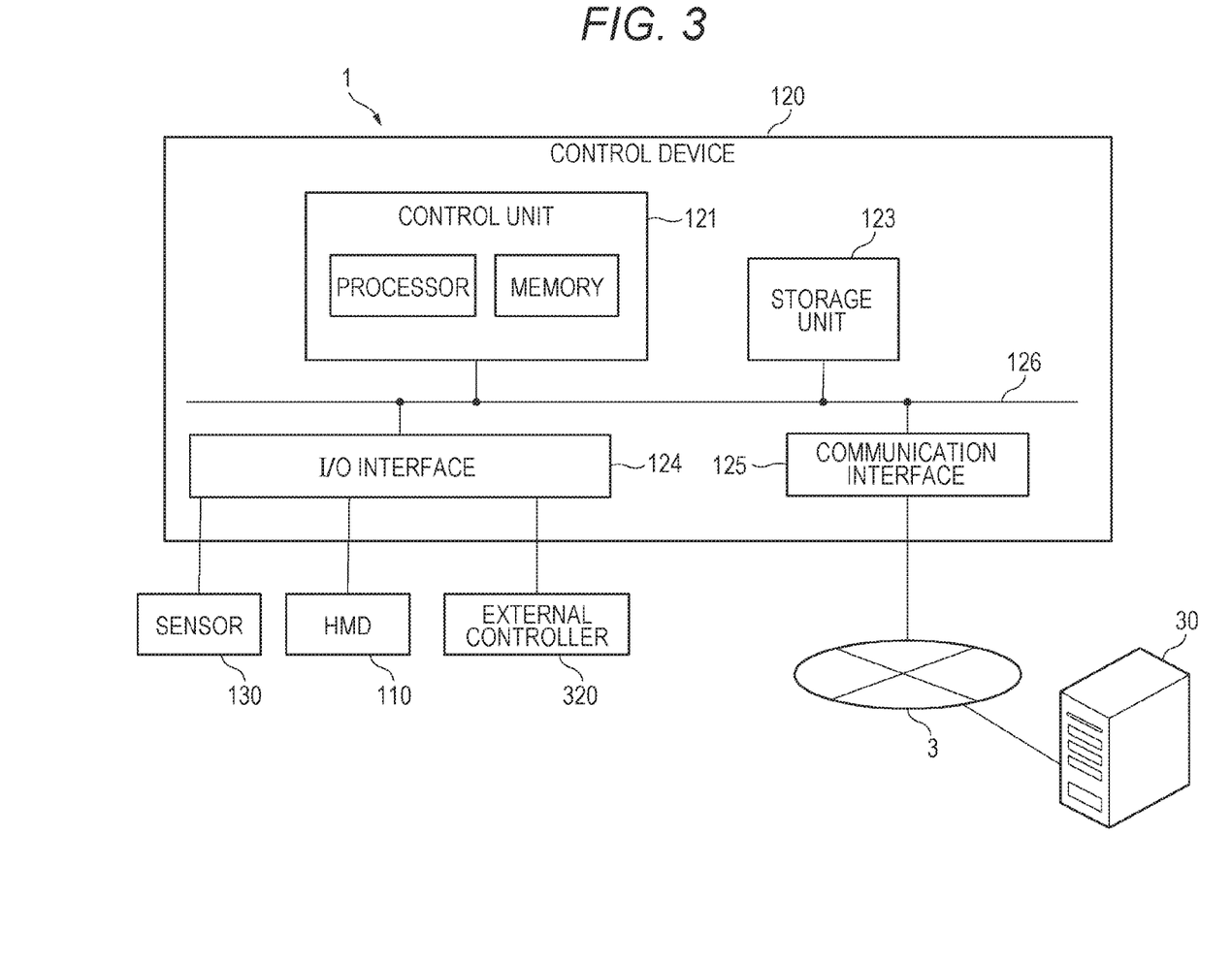
FIG. 3 is a diagram of a hardware configuration of a control device according to at least one embodiment of this disclosure.

Next, with reference to FIG. 3, a hardware configuration of the control device 120 is described. FIG. 3 is a diagram of the hardware configuration of the control device 120 and other hardware components. In FIG. 3, the control device 120 includes a control unit 121, a storage unit 123, an input/output (I/O) interface 124, a communication interface 125, and a bus 126. The control unit 121, the storage unit 123, the I/O interface 124, and the communication interface 125 are connected to each other via the bus 126 so as to enable communication therebetween.

The control device 120 may be constructed as a personal computer, a tablet computer, or a wearable device separately from the HMD 110, or may be built into the HMD 110. Further, a part of the functions of the control device 120 may be mounted to the HMD 110, and the remaining part of functions of the control device 120 may be mounted to another device separate from the HMD 110.

The control unit 121 includes a memory and a processor. The memory is constructed of, for example, a read only memory (ROM) having various programs and the like stored therein and a random access memory (RAM) having a plurality of work areas in which various programs to be executed by the processor are stored. The processor is constructed of, for example, a central processing unit (CPU), a micro processing unit (MPU) and/or a graphics processing unit (GPU), and is configured to develop, on the RAM, instructions designated by various programs installed into the ROM to execute various types of processing in cooperation with the RAM.

In particular, the control unit 121 may control various operations of the control device 120 by causing the processor to function, with the RAM, as a display control system (to be described later) for executing a display control method according to at least one embodiment. The control unit 121 executes a predetermined application (game program) stored in the memory or the storage unit 123 to provide a virtual space (visual-field image) on the display unit 112 of the HMD 110. With this, the user U can be immersed in the virtual space displayed on the display unit 112.

The storage unit (storage) 123 is a storage device, for example, a hard disk drive (HDD), a solid state drive (SSD), or a USB flash memory, and is configured to store instructions and various types of data (for example, virtual-space data or visual-field information data). The display control system may be incorporated into the storage unit 123. Further, the storage unit 123 may store instructions for authentication of the user U and game programs including data relating to various images and objects. Further, a database including tables for managing various types of data may be constructed in the storage unit 123.

The I/O interface 124 is configured to connect each of the position sensor 130, the HMD 110, and the external controller 320 to the control device 120 so as to enable communication therebetween, and is constructed of, for example, a universal serial bus (USB) terminal, a digital visual interface (DVI) terminal, or a High-Definition Multimedia Interface® (HDMI) terminal. The control device 120 may be wirelessly connected to each of the position sensor 130, the HMD 110, and the external controller 320.

The communication interface 125 is configured to connect the control device 120 to a communication network 3, for example, a local area network (LAN), a wide area network (WAN), or the Internet. The communication interface 125 includes various wire connection terminals and various processing circuits for wireless connection for communication to/from an external device, for example, a server 30, via the communication network 3, and is configured to adapt to communication standards for performing communication via the communication network 3.

Figure 4:
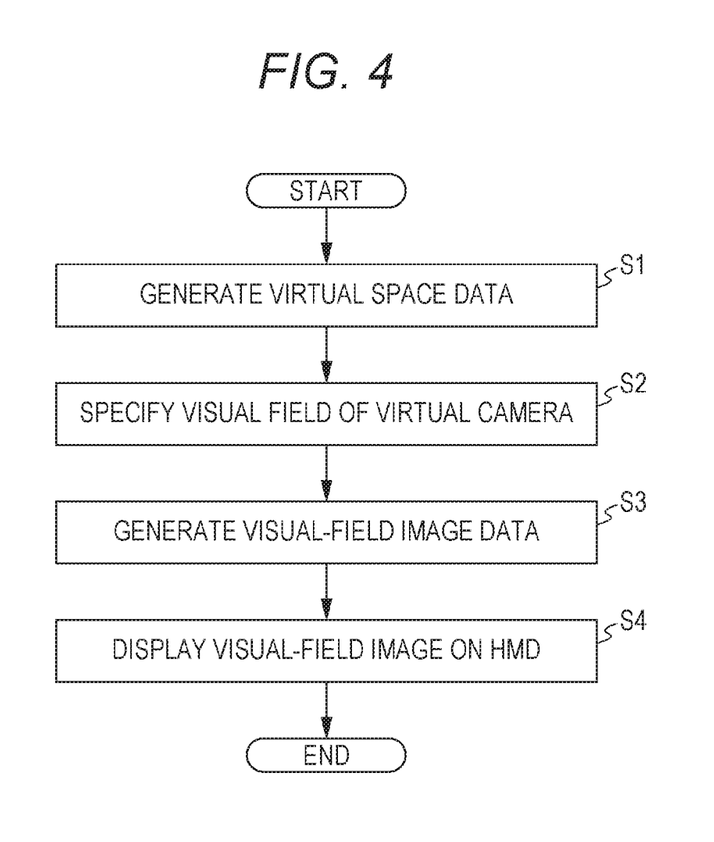
FIG. 4 is a flowchart of a method of processing for displaying a visual-field image on the HMD according to at least one embodiment of this disclosure.
Figure 5:
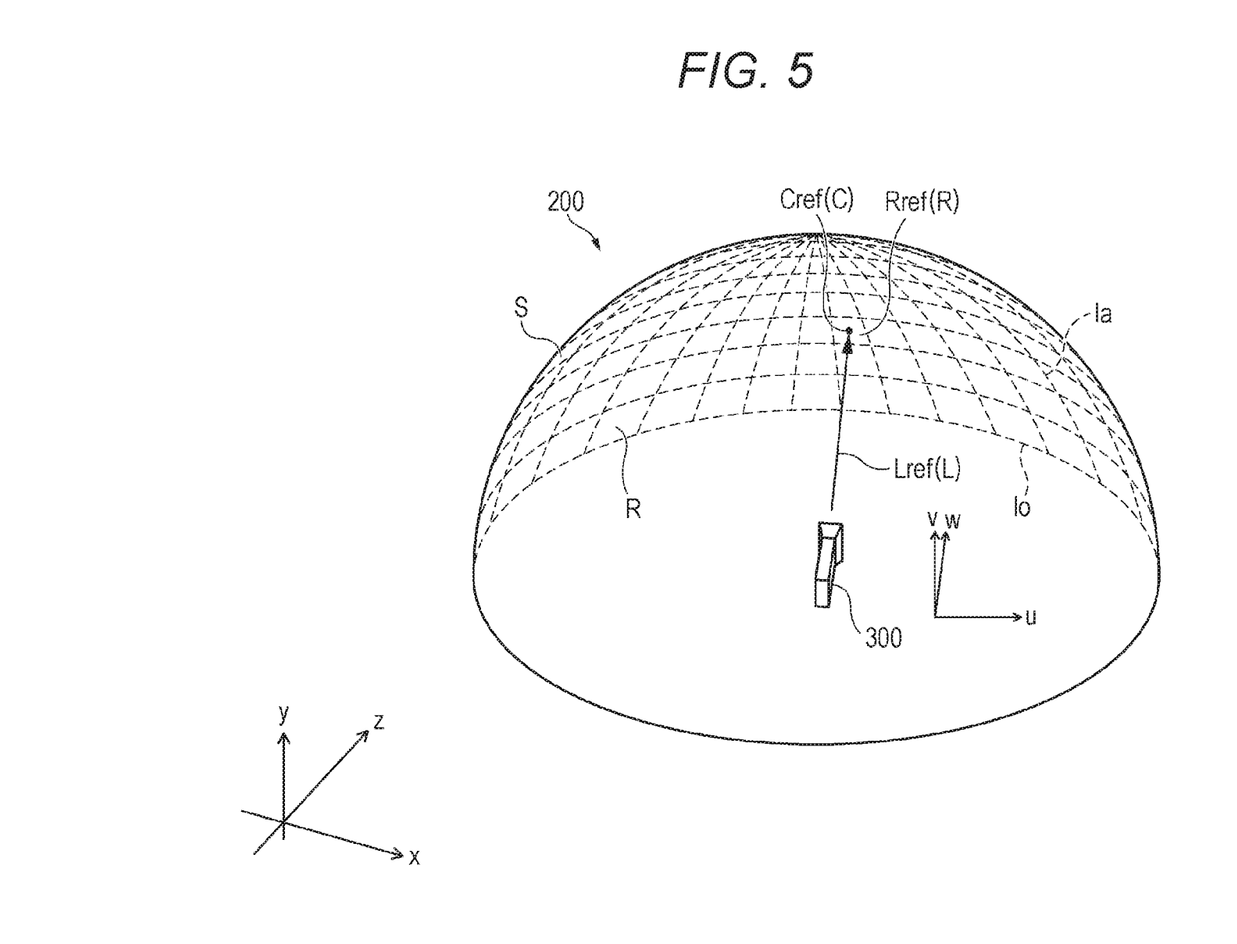
FIG. 5 is an xyz spatial diagram of an example of a virtual space whose surface is sectioned into a plurality of regions according to at least one embodiment of this disclosure.
Figure 7A:
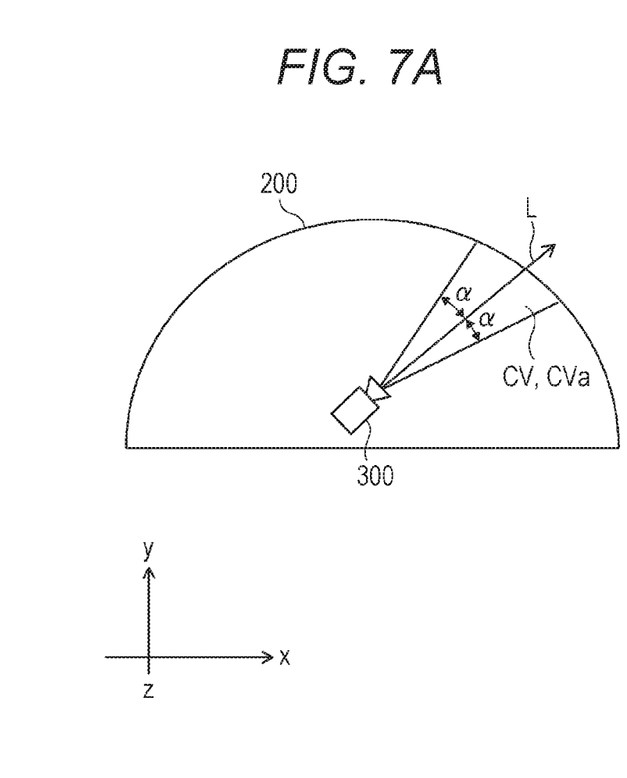
FIG. 7A is a yx plane diagram of the virtual space illustrated in FIG. 5 according to at least one embodiment.
Figure 7B:
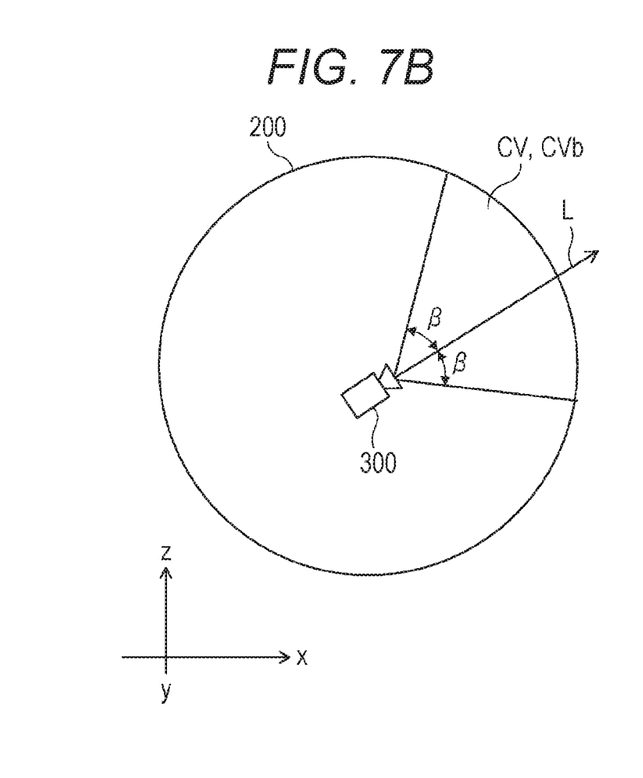
FIG. 7B is a zx plane diagram of the virtual space illustrated in FIG. 5 according to at least one embodiment.

Next, with reference to FIG. 4, FIG. 5, FIG. 7A, FIG. 7B, processing for displaying the visual-field image on the HMD 110 is described. FIG. 4 is a flow chart of a method of processing of displaying the visual-field image on the HMD 110. FIG. 5 is an xyz spatial diagram of an example of a virtual space 200. FIG. 7A is a yx plane diagram of the virtual space 200 in FIG. 5. FIG. 7B is a zx plane diagram of the virtual space 200 in FIG. 5.

In FIG. 4, in Step S1, the control unit 121 (see FIG. 3) generates virtual space data representing the virtual space 200 in which a virtual camera 300 is arranged. In FIG. 5, the virtual space 200 is defined as a celestial sphere having a center position as the center (in FIG. 5, only the upper-half of the celestial sphere is shown in FIG. 5 for clarity). Further, in the virtual space 200, an xyz coordinate system having the center position as the origin is set. In the initial state of the HMD system 1, the virtual camera 300 is arranged at the center position of the virtual space 200. The uvw coordinate system that defines the visual field of the virtual camera 300 is determined so as to synchronize with the uvw coordinate system that is defined about the head of the user U in the real space. Further, the virtual camera 300 may be moved in the virtual space 200 in synchronization with the movement in the real space of the user U wearing the HMD 110.

Next, in Step S2, the control unit 121 specifies a visual field CV (see FIG. 7A and FIG. 7B) of the virtual camera 300. Specifically, the control unit 121 acquires information relating to a position and an inclination of the HMD 110 based on data representing the state of the HMD 110, which is transmitted from the position sensor 130 and/or the HMD sensor 114. Next, the control unit 121 determines the position and the direction of the virtual camera 300 in the virtual space 200 based on the information relating to the position and the inclination of the HMD 110. Next, the control unit 121 determines a visual axis L of the virtual camera 300 based on the position and the direction of the virtual camera 300, and specifies the visual field CV of the virtual camera 300 based on the determined visual axis L. In this case, the visual field CV of the virtual camera 300 corresponds to a part of the region of the virtual space 200 that can be visually recognized by the user U wearing the HMD 110 (in other words, corresponds to a part of the region of the virtual space 200 to be displayed on the HMD 110). Further, the visual field CV has a first region CVa set as an angular range of a polar angle α about the visual axis L in the xy plane illustrated in FIG. 7A, and a second region CVb set as an angular range of an azimuth β about the visual axis L in the xz plane illustrated in FIG. 7B. The control unit 121 may specify the line-of-sight direction of the user U based on data representing the line-of-sight direction of the user U, which is transmitted from the eye gaze sensor 140, and may determine the direction of the virtual camera 300 based on the line-of-sight direction of the user U.

As described above, the control unit 121 can specify the visual field CV of the virtual camera 300 based on the data transmitted from the position sensor 130 and/or the HMD sensor 114. In this case, when the user U wearing the HMD 110 moves, the control unit 121 can change the visual field CV of the virtual camera 300 based on the data representing the movement of the HMD 110, which is transmitted from the position sensor 130 and/or the HMD sensor 114. That is, the control unit 121 can change the visual field CV in accordance with the movement of the HMD 110. Similarly, when the line-of-sight direction of the user U changes, the control unit 121 can move the visual field CV of the virtual camera 300 based on the data representing the line-of-sight direction of the user U, which is transmitted from the eye gaze sensor 140. That is, the control unit 121 can change the visual field CV in accordance with the change in the line-of-sight direction of the user U.

Next, in Step S3, the control unit 121 generates visual-field image data representing the visual-field image to be displayed on the display unit 112 of the HMD 110. Specifically, the control unit 121 generates the visual-field image data based on the virtual space data defining the virtual space 200 and the visual field CV of the virtual camera 300.

Next, in Step S4, the control unit 121 displays the visual-field image on the display unit 112 of the HMD 110 based on the visual-field image data. As described above, the visual field CV of the virtual camera 300 changes in accordance with the movement of the user U wearing the HMD 110, and thus the visual-field image to be displayed on the display unit 112 of the HMD 110 changes as well. Thus, the user U can be immersed in the virtual space 200.

The virtual camera 300 may include a left-eye virtual camera and a right-eye virtual camera. In this case, the control unit 121 generates left-eye visual-field image data representing a left-eye visual-field image based on the virtual space data and the visual field of the left-eye virtual camera. The control unit 121 generates right-eye visual-field image data representing a right-eye visual-field image based on the virtual space data and the visual field of the right-eye virtual camera. Then, the control unit 121 displays the left-eye visual-field image and the right-eye visual-field image on the display unit 112 of the HMD 110 based on the left-eye visual-field image data and the right-eye visual-field image data. In this manner, the user U can visually recognize the visual-field image as a three-dimensional image from a combination of the left-eye visual-field image and the right-eye visual-field image. For the sake of convenience of description, the number of the virtual cameras 300 is one herein. As a matter of course, at least one embodiment of this disclosure is also applicable to a case where the number of the virtual cameras is more than one.

Figure 8:
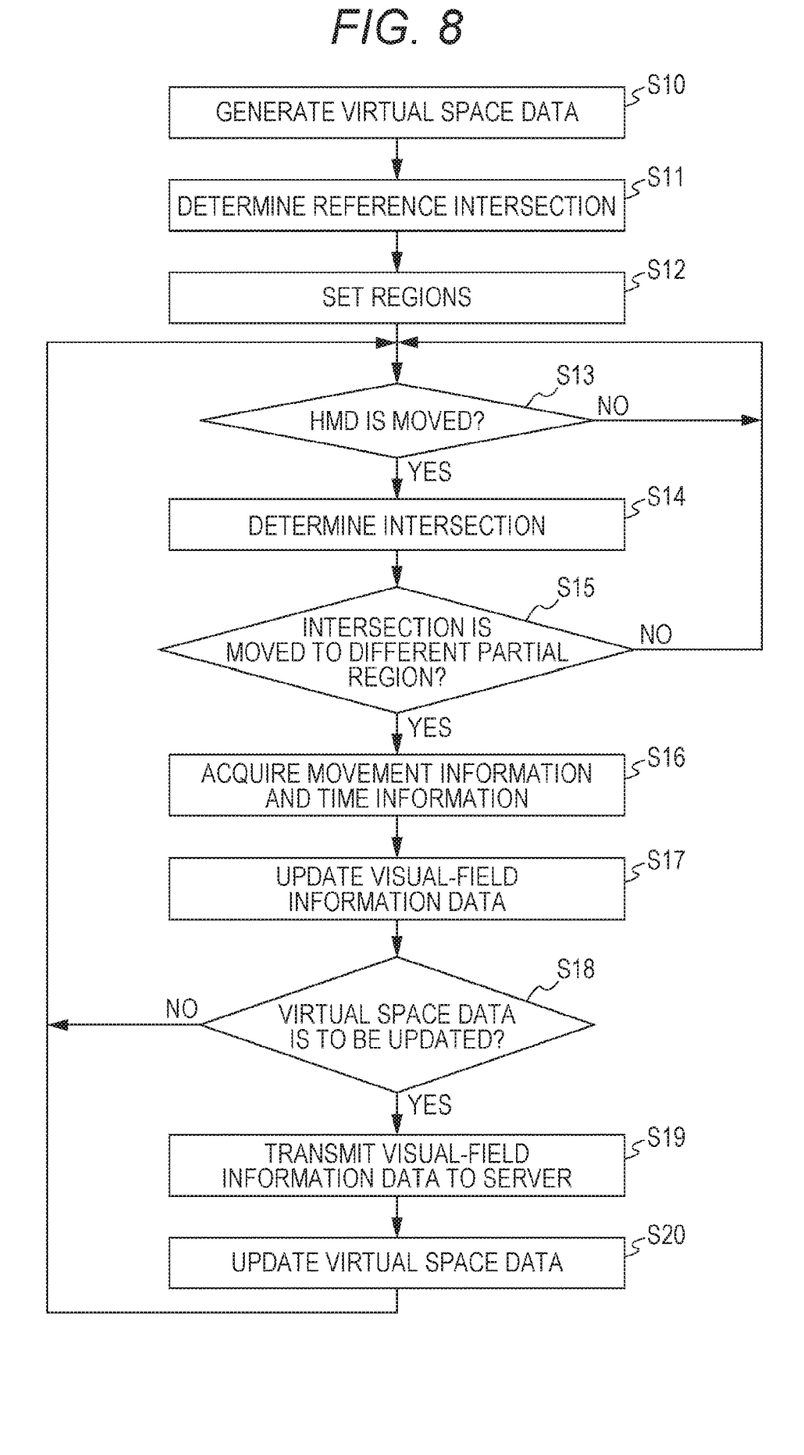
FIG. 8 is a flow chart of a visual-field information collection method according to at least one embodiment of this disclosure.
Figure 9:
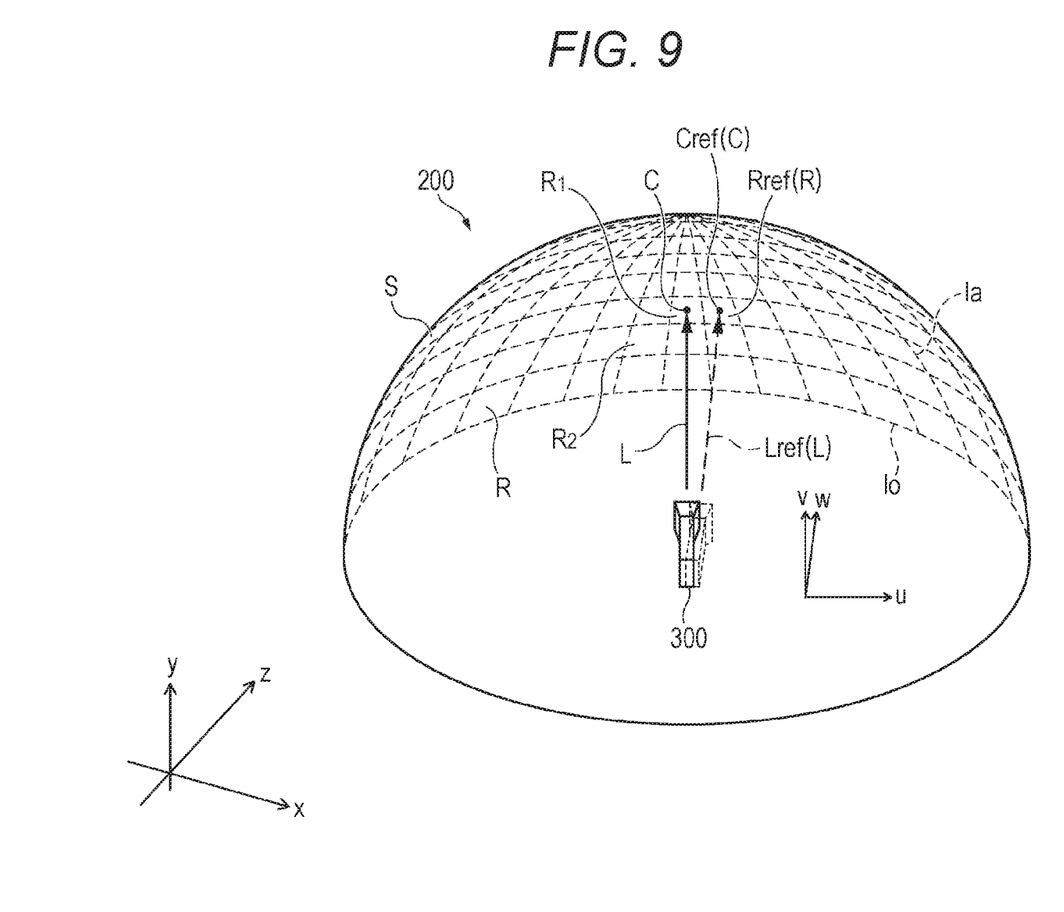
FIG. 9 is a diagram of a state in which the intersection is moved from a reference partial region to another partial region along with the movement of the visual axis of the virtual camera according to at least one embodiment of this disclosure.

Next, the visual-field information collection method according to at least one embodiment is described with reference to FIG. 5, FIG. 8, and FIG. 9. FIG. 8 is a flow chart of a visual-field information collection method according to at least one embodiment. FIG. 9 is a diagram of a state in which an intersection C at which the visual axis L of the virtual camera 300 and a surface S of the virtual space 200 intersect with each other is moved from a reference partial region Rref to a different partial region R1 along with the movement of the visual axis L of the virtual camera 300.

In FIG. 5 and FIG. 9, for the sake of convenience of description, latitude lines lo and longitude lines la on the front side (−z side) of the surface S of the virtual space 200 are not shown for clarity. Latitude lines lo and longitude lines la and a plurality of regions R on the deep side (+z side) of the surface S of the virtual space 200 are shown.

In FIG. 8, in Step S10, the control unit 121 (see FIG. 3) generates virtual space data representing the virtual space 200 in which the virtual camera 300 is arranged. Step S10 is the same as Step S1 of FIG. 4 and the description is not repeated for the sake of brevity.

Next, in Step S11, the control unit 121 determines a reference intersection Cref (see FIG. 5) at which a reference visual axis Lref, which defines a reference visual field of the virtual camera 300, and the surface S of the virtual space 200 intersect with each other. In this case, the reference visual field refers to a visual field in the initial state of the virtual camera 300. Further, the reference visual axis Lref refers to a visual axis L in the initial state of the virtual camera 300.

Next, in Step S12, the control unit 121 sections the surface S of the virtual space 200 into the plurality of regions R with use of latitude lines lo arranged at a predetermined angular spacing relative to virtual camera 300 and longitude lines la arranged at a predetermined angular spacing relative to virtual camera 300. In other words, the control unit 121 sets the plurality of regions R on the surface S by providing a grid formed of the latitude lines lo and the longitude lines la on the surface S of the spherical virtual space 200.

Regarding this point, the control unit 121 sections the surface S of the virtual space 200 into the plurality of regions R so that the reference intersection Cref is prevented from being located on a boundary line (that is, on any latitude line lo or any longitude line la) between the plurality of regions R. In at least one embodiment, the control unit 121 sections the surface S of the virtual space 200 into the plurality of regions R so that the reference intersection Cref is located at a center of a predetermined partial region among the plurality of regions R and at a vicinity of the center. In this case, a partial region R in which the reference intersection Cref is present is referred to as "reference partial region Rref".

Further, the number of the latitude lines lo is set in accordance with an angular spacing between adjacent latitude lines lo. For example, when the angular spacing between the adjacent latitude lines lo is 15°, (90°/15°)−1=5 is obtained, and hence the number of the latitude lines lo in virtual space 200 is set as 5. Similarly, the number of the longitude lines la is set in accordance with the angular spacing between adjacent longitude lines la. For example, when the angular spacing between the adjacent longitude lines la is 15°, 360°/15°=24 is obtained, and hence the number of the longitude lines la in virtual space 200 is set as 24. The control unit 121 can set the number of the latitude lines lo and the number of the longitude lines la as appropriate based on the type of the virtual space data.

Further, the number of the regions R is determined based on the number of the longitude lines la and the number of the latitude lines lo. For example, when the number of the longitude lines la is n and the number of the latitude lines lo is m, a total number N of the regions R is N=n×(m+1) (provided that n≥2).

Next, in Step S13, the control unit 121 determines whether or not the HMD 110 is moved. Specifically, the control unit 121 may determine that the HMD 110 is moved by receiving data representing the state of the HMD 110 from the position sensor 130 and/or the HMD sensor 114. Alternatively, the control unit 121 may acquire information relating to the position and the inclination of the HMD 110 based on the data representing the state of the HMD 110, which is transmitted from the position sensor 130 and/or the HMD sensor 114, and determine whether or not the HMD 110 is moved based on the acquired information.

Figure 6:
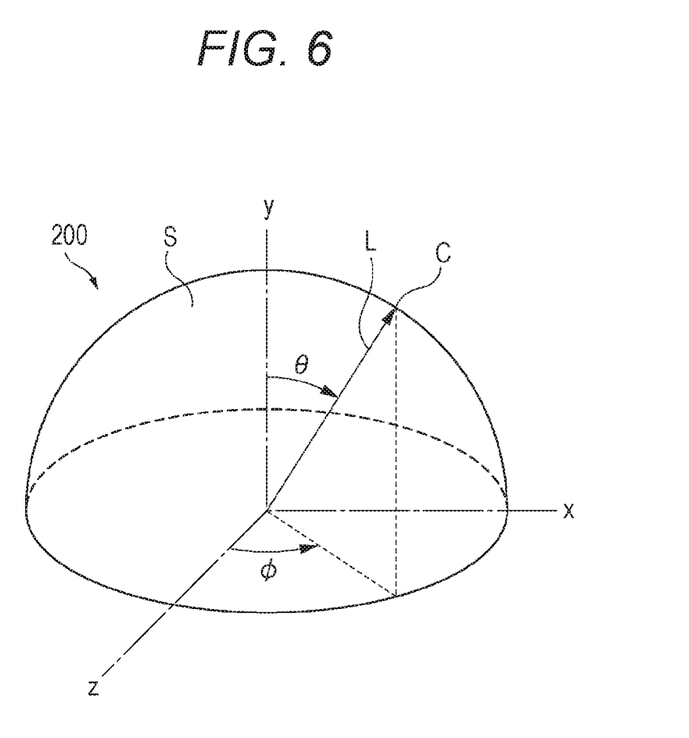
FIG. 6 is a diagram of specifying an intersection at which a visual axis of a virtual camera and the surface of the virtual space intersect with each other based on latitude and longitude according to at least one embodiment of this disclosure.

When the control unit 121 determines that the HMD 110 is moved (YES in Step S13), the control unit 121 updates the position and the direction of the virtual camera 300 in the virtual space 200, and determines the position of the intersection C at which the moved visual axis L of the virtual camera 300 and the surface S of the virtual space 200 intersect with each other (Step S14). For example, under a state in which the virtual camera 300 is arranged at the center position of the virtual space 200, the intersection C is determined based on a radius r of the virtual space 200, and on a latitude θ and a longitude φ of the visual axis L illustrated in FIG. 6. In this case, the radius r of the virtual space 200 has a known value, and hence the control unit 121 determines the intersection C based on the latitude θ and the longitude φ of the visual axis L. On the other hand, when the control unit 121 determines that the HMD 110 is not moved (NO in Step S13), the processing returns to Step S13.

In Step S13, the control unit 121 determines whether or not the HMD 110 is moved, but alternatively, the control unit 121 may determine whether or not a line-of-sight direction of the user U is changed. In this case, the control unit 121 may receive information from the eye gaze sensor 140 to determine that the line-of-sight direction of the user U is changed. Alternatively, the control unit 121 may acquire information relating to the line-of-sight direction of the user U based on information transmitted from the eye gaze sensor 140, and determine whether or not the line-of-sight direction of the user U is changed based on the acquired information. In at least one embodiment, the control unit 121 updates the position and direction of virtual camera 300 in response to a change in the light-of-sight direction of the user U.

Next, in Step S15, the control unit 121 determines whether or not the intersection C is moved to a different partial region R. For example, when the control unit 121 determines that, in FIG. 9, the intersection C is moved from the reference partial region Rref (first partial region) to the partial region R1 (second partial region) (YES in Step S15), the control unit 121 acquires movement information representing that the intersection C is moved to the partial region R1 (that is, information representing a partial region at a movement destination), and time information representing the time when the intersection C is moved to the partial region R1 (Step S16). On the other hand, when the control unit 121 determines that the intersection C is not moved to a different partial region R (that is, when the control unit 121 determines that the intersection C stays at the same partial region R), the processing returns to Step S13.

In this case, the partial region R is defined based on the latitude lines lo and the longitude lines la, and hence each partial region R has an angular range of the latitude θ and the longitude φ. Further, as described above, the intersection C is determined based on the latitude θ and the longitude φ of the visual axis L. In this manner, the control unit 121 can determine whether or not the intersection C is moved to a different partial region R without performing complicated calculation by determining the latitude θ and the longitude φ of the moved visual axis L.

Next, in Step S17, the control unit 121 updates the visual-field information data stored in the storage unit 123. An example of the visual-field information data is shown below.

TABLE 1

<Visual-field information data>

| User ID | Partial region R at movement destination | Staying duration T |
|---|---|---|
| X | R1 | 10 seconds |
|  | R2 | 5 seconds |
|  | . . . | . . . |

In this case, the visual-field information data includes information relating to the user ID of the user U, the partial region R at the movement destination, and a staying duration T during which the intersection stays in the partial region R at the movement destination. For example, when the intersection C is moved from the reference partial region Rref to the partial region R1 at a time t1, and is then moved from the partial region R1 to a partial region R2 at a time t2, the control unit 121 determines the staying duration T in the partial region R1 at the movement destination based on the time t1 and the time t2 (that is, by subtracting the time t1 from the time t2). After that, the control unit 121 updates the content of the visual-field information data stored in the storage unit 123 based on the information relating to the partial region R1 at the movement destination and the staying duration T (T=t2−t1) in the partial region R1. The control unit 121 may update the visual-field information data based on the information relating to the partial region R1 when the partial region R1 at the movement destination is determined, and then update the visual-field information data again based on the information relating to the staying duration T when the staying duration T in the partial region R1 is determined. As described above, the visual-field information data is generated based on a plurality of pieces of movement information and a plurality of pieces of time information.

Next, in Step S18, the control unit 121 determines whether or not the virtual space data is to be updated. For example, when the control unit 121 determines that the scene of the virtual space 200 is to be switched, the control unit 121 determines that the virtual space data is to be updated. After that, when the control unit 121 determines that the virtual space data is to be updated (YES in Step S18), the control unit 121 transmits the visual-field information data stored in the storage unit 123 to the server 30 via the communication interface 125 and the communication network 3 (Step S19), and then updates the virtual space data (Step S20). On the other hand, when the control unit 121 determines that the virtual space data is not to be updated (NO in Step S18), the processing returns to Step S13.

According to at least one embodiment, the surface S of the virtual space 200 is sectioned into the plurality of regions R. Then, when the intersection C at which the visual axis L of the virtual camera 300 and the surface S of the virtual space 200 intersect with each other is moved to a different partial region R, the movement information representing that the intersection C is moved to a different partial region R is generated. On the other hand, when the intersection C is moved within the same partial region R, the movement information is not generated. In this manner, the movement information is not generated for all of the movements of the user U wearing the HMD 110, and hence the calculation amount of the control unit 121 (processor) can be reduced.

Further, the surface S of the virtual space 200 is sectioned into the plurality of regions R with use of the latitude lines lo and the longitude lines la, and hence determining whether or not the intersection C is moved to a different partial region R based on the information relating to the change in angle (latitude θ and longitude φ) of the visual axis L of the virtual camera 300. In this manner, the calculation amount of the control unit 121 can be reduced. Further, each partial region R can be equally treated when the movement information is subjected to statistical processing.

Further, the time information representing the time when the intersection C is moved to a different partial region R is acquired together with the movement information, and hence the visual-field information of the user U can be analyzed from various angles. In particular, when the information relating to the staying duration T in the partial region R at the movement destination is analyzed, the region in the virtual space 200 which is paid attention to by each user can be analyzed. Further, when the staying duration T exceeds a threshold, the user U is determined to not be wearing the HMD 110. In at least one embodiment, the threshold is 30 seconds, 1 minute, 2 minutes or another suitable threshold. In this manner, the staying duration T that exceeds the threshold may be removed from an activation time of the HMD 110, to thereby estimate a duration during which the user U is actually wearing the HMD 110.

Further, the visual-field information data of each user is transmitted to the server 30 via the communication network 3. In this manner, the visual-field information data of each user, which is transmitted to the server 30, can be utilized as big data, to thereby analyze a focused region or a non-focused region in the virtual space 200. In this manner, for example, an optimum layout of the object in the virtual space 200 can be determined based on the visual-field information data. Further, the user's behavior in the virtual space 200 can be analyzed.

Further, according to at least one embodiment, the visual-field information data is transmitted to the server 30 when the virtual space data is updated. In this manner, the movement information and the time information are not transmitted to the server 30 every time the movement information and the time information are acquired, and hence a load of communication between the HMD system 1 (user terminal) and the server 30 can be reduced.

Further, the surface S of the virtual space 200 is sectioned into the plurality of regions R so that the reference intersection Cref is prevented from being located on the boundary line (that is, on the latitude line lo or the longitude line la) between the plurality of regions R. Regarding this point, for example, when the reference intersection Cref is located on the boundary line (latitude line lo or longitude line la) between the plurality of regions R, the intersection C is frequently moved to a different partial region R in accordance with a small movement of the user U wearing the HMD 110. Therefore, the control unit 121 (processor) frequently acquires the movement information and the time information, and hence the calculation load of the control unit 121 is increased. On the other hand, when the reference intersection Cref is not located on the boundary line (that is, on the latitude line lo or the longitude line la) between the plurality of regions R, the above-mentioned situation where the calculation load of the control unit 121 is increased can be reduced or prevented. In particular, when the reference intersection Cref is located at the center of the reference partial region Rref and at the vicinity of the center, a situation where the intersection C is frequently moved to a different partial region R in accordance with a small movement of the user U can be suitably prevented.

Figure 10:
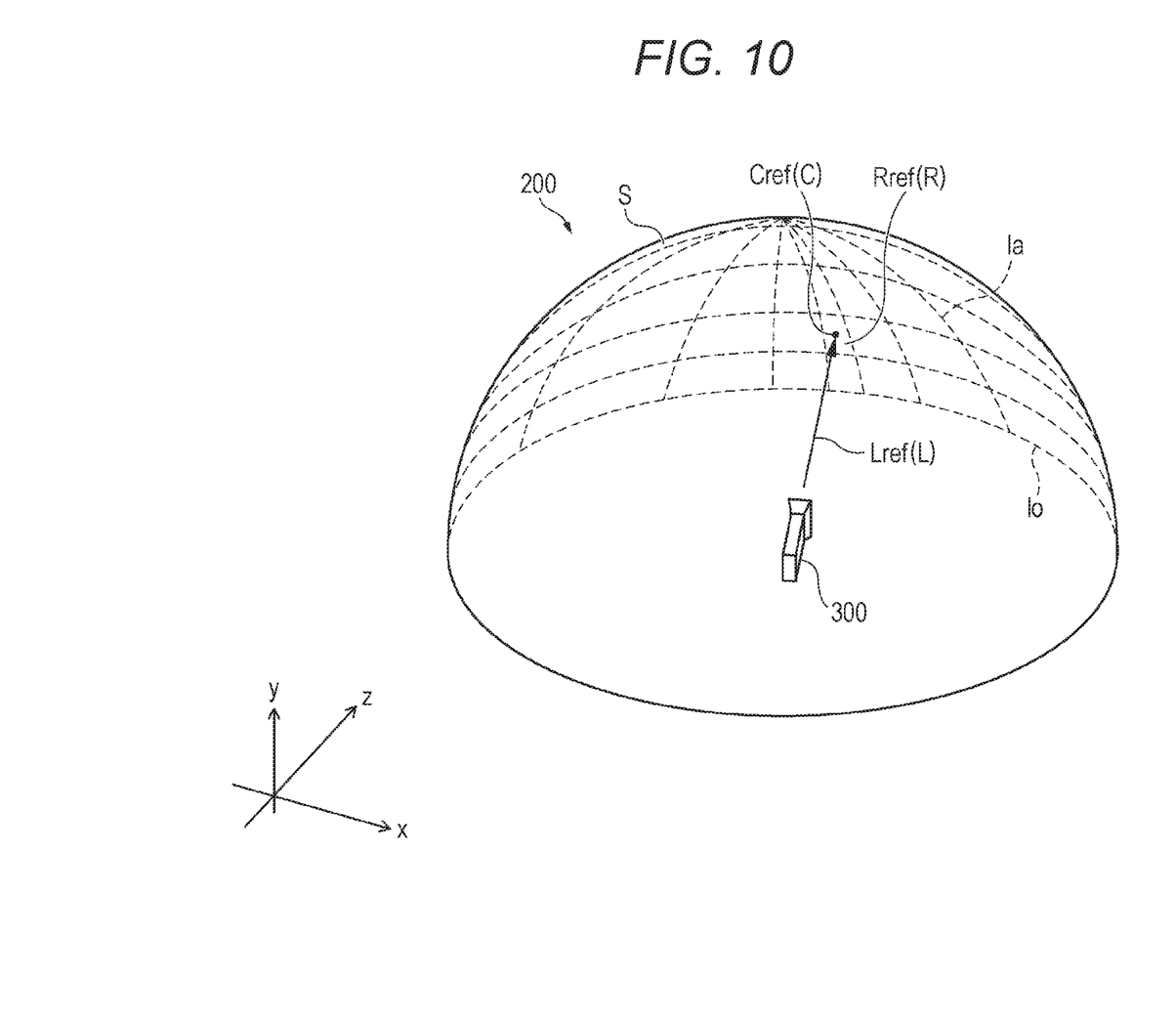
FIG. 10 is a diagram of regions in which an angular spacing between adjacent latitude lines and an angular spacing between adjacent longitude lines are increased as the lines are separated from a reference intersection at which a reference visual axis of the virtual camera and the surface of the virtual space intersect with each other according to at least one embodiment of this disclosure.

Further, in at least one embodiment, in FIG. 5 and FIG. 8, the angular spacing between the adjacent latitude lines lo and the angular spacing between the adjacent longitude lines la are fixed, but the angular spacing between the adjacent latitude lines lo and/or the angular spacing between the adjacent longitude lines la may not be fixed. For example, as illustrated in FIG. 10, the angular spacing between the adjacent longitude lines la may be increased as the longitude lines la are separated from the reference intersection Cref. Similarly, the angular spacing between the adjacent latitude lines lo may be increased as the latitude lines lo are separated from the reference intersection Cref. In this manner, a partial region R close to the reference intersection C (including the reference partial region Rref) is formed to be smaller than a partial region R separated from the reference intersection Cref. As a result, the visual-field information data can be collected more precisely.

Further, in order to achieve various types of processing to be executed by the control unit 121 with use of software, the display control system for executing the display control method of at least one embodiment may include instructions installed in advance into the storage unit 123 or the ROM. Alternatively, the instructions for execution by the display control system may be stored in a computer-readable storage medium, for example, a magnetic disk (HDD or a floppy disk), an optical disc (for example, CD-ROM, DVD-ROM, and Blu-ray disc), a magneto-optical disk (for example, MO), and a flash memory (for example, an SD card, a USB memory, and an SSD). In this case, the storage medium is connected to the control device 120, and thus the instructions stored in the storage medium is installed into the storage unit 123. Then, the instructions for the display control system are installed in the storage unit 123 is loaded onto the RAM, and the processor executes the loaded program. In this manner, the control unit 121 executes the display control method of at least one embodiment.

Further, the instructions for the display control system may be downloaded from a computer on the communication network 3 via the communication interface 125. Also in this case, the downloaded instructions are similarly installed into the storage unit 123.

This concludes description of at least one embodiment of this disclosure. However, the description of at least one embodiment is not to be read as a restrictive interpretation of the technical scope of this disclosure. The at least one embodiment described is merely given as an example, and a person skilled in the art would understand that various modifications can be made to at least one embodiment within the scope of this disclosure set forth in the appended claims. Thus, the technical scope of this disclosure is to be defined based on the scope of this disclosure set forth in the appended claims and an equivalent scope thereof.

For example, in at least one embodiment, the surface S of the virtual space 200 is sectioned into the plurality of regions R with use of the latitude lines lo and the longitude lines la, but the movement of the visual axis L of the virtual camera 300 may be determined without sectioning the surface S of the virtual space 200 into the plurality of regions R. That is, the control unit 121 may determine whether or not the visual axis L is moved from a predetermined first position to a predetermined second position, and when the control unit 121 determines that the visual axis L is moved from the predetermined first position to the predetermined second position, the movement information (for example, coordinates of the moved intersection C) representing that the visual axis L is moved, and the time information representing the time when the visual axis L is moved may be acquired. Regarding this point, when the visual axis L is moved in accordance with the movement of the user U wearing the HMD 110, the control unit 121 determines whether or not the maximum value of a movement amount of the visual axis L within unit time exceeds a predetermined threshold value. Then, when the control unit 121 determines that the maximum value of the movement amount of the visual axis L within unit time exceeds the predetermined threshold value, the control unit 121 may acquire the movement information and the time information (Step S16 of FIG. 8). On the other hand, when the control unit 121 determines that the maximum value of the movement amount of the visual axis L within unit time does not exceed the predetermined threshold value, the processing may return to Step S13 of FIG. 8. In this case, similarly, the movement information and the time information are not generated for all of the movements of the user U wearing the HMD 110, and hence the calculation amount of the control unit 121 can be reduced.

What is claimed is:

1. A method comprising:
defining a virtual space for display on a head mounted display (HMD);
defining an angular interval associated with a surface of the virtual space, the angular interval including a first angular region and a second angular region next to the first angular region;
detecting a line-of-sight of the user associated with the HMD;
specifying a visual field in the virtual space in accordance with the detected line-of-sight;
displaying an image in accordance with the visual field on the HMD;
detecting a movement of an angle of the line-of-sight;
updating the visual field in accordance with the movement of the line-of-sight;
specifying the angle of the line-of-sight being as being located within the first angular region;
determining a shift of the angle of the line-of-sight from the first angular region to the second angular region based on the detected movement of the line-of-sight;
generating movement information in response to the determined shift of the angle; and
transmitting the movement information to a server.

2. The method of claim 1, further comprising:
displaying a 360-degree movie on the surface;
generating time information for specifying a time at which the shift of the angle is determined;
transmitting the time information to the server.

3. The method of claim 1, further comprising:
displaying a 360-degree movie on the surface;
storing a plurality of instances of the generated movement information;
changing the 360-degree movie displayed on the surface;
transmitting each of the plurality of instances of the generated movement information to the server at a single time in response to the changing of the 360-degree movie.

4. The method of claim 1, wherein:
the defining of the angular interval further comprising:
sectioning the surface of the virtual space into a plurality of regions including a first region associated with the first angular region, and a second region associated with the second angular region.

5. The method of claim 4, wherein:
the detecting of the movement of the angle of the line-of-sight further comprising;
defining a reference intersection being separated from a boundary of each region of the plurality of regions;
specifying an intersection between the detected line-of-sight and the surface of the virtual space;
specifying an angle between the reference intersection and the specified intersection.

6. The method of claim 1, wherein the defining the angular interval comprises setting the first angular region not overlapping with the second angular region.

7. The method of claim 1, further comprising determining a staying duration for which the shifted intersection in the second region.

8. The method of claim 7, further comprising determining that a user is not wearing the HMD in response to the staying duration exceeding a threshold time.

9. The method of claim 1, further comprising maintaining the visual field in response to the shifted intersection being in the first region.

10. A system comprising:
a head mounted display (HMD);
a sensor;
a processor connected to the HMD and the sensor; and
a non-transitory memory for storing instructions, wherein the processor is configured to execute the instructions for:
defining a virtual space for display on the HMD;
defining an angular interval associated with a surface of the virtual space, the angular interval including a first angular region and a second angular region next to the first angular region;
detecting a line-of-sight of the user associated with the HMD;
specifying a visual field in the virtual space in accordance with the detected line-of-sight;
displaying an image in accordance with the visual field on the HMD;
detecting a movement of an angle of the line-of-sight;
updating the visual field in accordance with the movement of the line-of-sight;
specifying the angle of the line-of-sight being as being located within the first angular region;
determining a shift of the angle of the line-of-sight from the first angular region to the second angular region based on the detected movement of the line-of-sight;
generating movement information in response to the determined shift of the angle; and
transmitting the movement information to a server.

11. The system of claim 10, wherein the processor is further configured to receive virtual space data for defining the virtual space from an external storage device.

* * * * *